United States Patent
Kore et al.

(10) Patent No.: US 9,860,314 B2
(45) Date of Patent: Jan. 2, 2018

(54) DATA SYNCHRONIZATION SYSTEM AND METHODS IN A NETWORK USING A HIGHLY-AVAILABLE KEY-VALUE STORAGE SYSTEM

(71) Applicants: Mallikarjunappa Kore, Alpharetta, GA (US); Aung Htay, Alpharetta, GA (US); Kumaresh Malli, Alpharetta, GA (US)

(72) Inventors: Mallikarjunappa Kore, Alpharetta, GA (US); Aung Htay, Alpharetta, GA (US); Kumaresh Malli, Alpharetta, GA (US)

(73) Assignee: Ciena Corporation, Hanover, MD (US)

(*) Notice: Subject to any disclaimer, the term of this patent is extended or adjusted under 35 U.S.C. 154(b) by 164 days.

(21) Appl. No.: 14/463,228

(22) Filed: Aug. 19, 2014

(65) Prior Publication Data
US 2016/0057219 A1 Feb. 25, 2016

(51) Int. Cl.
*H04L 29/08* (2006.01)

(52) U.S. Cl.
CPC ...... *H04L 67/1095* (2013.01); *H04L 67/1097* (2013.01); *H04L 67/28* (2013.01)

(58) Field of Classification Search
CPC .. H04L 67/1095; H04L 67/28; H04L 67/1097
See application file for complete search history.

(56) References Cited

U.S. PATENT DOCUMENTS

| | | | |
|---|---|---|---|
| 7,434,046 B1 * | 10/2008 | Srivastava | H04L 9/0825 380/264 |
| 7,516,178 B1 * | 4/2009 | DeFrang | G06F 9/548 709/201 |
| 7,694,001 B2 | 4/2010 | Burdick et al. | |
| 9,069,827 B1 * | 6/2015 | Rath | G06F 17/30557 |
| 9,208,295 B2 * | 12/2015 | Cam-Winget | G06F 21/30 |
| 9,300,593 B2 * | 3/2016 | Thakkar | H04L 47/50 |
| 2007/0156842 A1 * | 7/2007 | Vermeulen | G06F 17/30212 709/217 |
| 2010/0333116 A1 | 12/2010 | Prahlad et al. | |
| 2012/0246190 A1 * | 9/2012 | Surtani | G06F 17/30575 707/769 |
| 2012/0310882 A1 | 12/2012 | Werner et al. | |

(Continued)

OTHER PUBLICATIONS

Ionescu, Bogdan, Hadi Nasrallah, and Dan Ionescu. "A CORBA-based Collaborative Environment for Java Applications."*

(Continued)

*Primary Examiner* — Scott B Christensen
*Assistant Examiner* — Lam Do
(74) *Attorney, Agent, or Firm* — Clements Bernard Walker PLLC; Christopher L. Bernard; Lawrence A. Baratta, Jr.

(57) ABSTRACT

A data synchronization method, in a network element operating in a network, includes generating an event at the network element that needs to be synchronized with other devices in the network; based on assigned tokens for the network element, generating a row key for the event; and providing the row key to a Highly-Available (HA) key-value storage system for synchronization therewith, wherein the HA key-value storage system includes a plurality of nodes including the network element and the other devices.

18 Claims, 15 Drawing Sheets

(56) References Cited

U.S. PATENT DOCUMENTS

| | | | | |
|---|---|---|---|---|
| 2014/0173018 A1* | 6/2014 | Westphal | ............ | H04L 41/0823 709/213 |
| 2014/0280893 A1* | 9/2014 | Pfeifer | .................... | H04L 43/04 709/224 |
| 2016/0065548 A1* | 3/2016 | Brouwer | ............... | H04L 63/061 713/171 |

OTHER PUBLICATIONS

Koldehofe, Boris, Frank Dürr, and Muhammad Adnan Tariq. "Tutorial: event-based systems meet software-defined networking." Proceedings of the 7th ACM international conference on Distributed event-based systems. ACM, 2013.*

"Network Management Systems Architectural Leading Practice" http://web.archive.org/web/20080720044803/http://www.cisco.com/en/US/technologies/tk869/tk769/technologies_white_paper0900aecd806bfb4c.html, Published Jul. 20, 2008.*

Varia, Jinesh. "Architecting for the cloud: Best practices." Amazon Web Services. Jan. 2011.*

Marconett, Dan, Yoo, S.J.B., "FlowBroker: A Software-Defined Network Controller Architecture for Multi-Domain Brokering and Reputation;" Jul. 14, 2014, http://link.springer.com/article/10.1007/s10922-014-9325-5.*

Ho, Ricky, "Everything You Need to Know About Couchbase Architecture;" Jul. 7, 2012, https://dzone.com/articles/couchbase-architecture-deep.*

DataStax Corporation, "Introduction to Apache Cassandra;" Jul. 2012, https://web.archive.org/web/20121025095428/https://www.datastax.com/wp-content/uploads/2012/08/WP-IntrotoCassandra.pdf.*

Renesse, Robbert van, Minsky, Yaron, Hayden, Mark, "A Gossip-Style Failure Detection Service;" 1998 http://link.springer.com/chapter/10.1007/978-1-4471-1283-9_4.*

"Ciena Cloud Networking: Virtualization and Automation," Ciena Corporation, pp. 1-3.

DeCandia et al., "Dynamo: Amazon's Highly Available Key-value Store," Amazon.com, pp. 1-16.

\* cited by examiner

| ORIG NODE | ORIG LINK | TERM NODE | TERM LINK | LABEL | STATE | ADMIN WEIGHT | BUNDLE ID | SERVICE TYPE | IS MASTER | MAX BW | AVAIL BW | DELAY |
|---|---|---|---|---|---|---|---|---|---|---|---|---|
| 44d19acf8 ab28c5b0 67e34ec6 5869d27a | | | | | | | | | | | | |
| 5410_NE_A7 7 | 1 | 5410_NE _A92 | 1 | A1 | UP | 5040 | 1,2,3 | OTN | Yes | ODU2 | ODU2 | 20000 |
| 403c7ef4 6b6ad7a2 5b5a17fe9 0241087 | | | | | | | | | | | | |
| 5410_NE_A9 2 | 20 | 5410_NE _A105 | 20 | A2 | UP | 5040 | 3,4,5 | OTN | No | ODU3 | ODU3 | 20000 |
| 46f8f229fe 76010daa e7c3e845 261b790 | | | | | | | | | | | | |
| 5410_NE_A9 2 | 10 | 5410_NE _A77 | 22 | B1 | UP | 200 | 1 | OTN | No | ODU2 | ODU2 | 5000 |

FIG. 6

| | ORIG NODE | ORIG LINK | TERM NODE | TERM LINK | LABEL | ADMIN STATE | OPERATIONAL STATE | LINE AID | TERM LINE AID | COMMON ID | OOB COMMON ID | DELAY (uSec) | SERVICE TYPE |
|---|---|---|---|---|---|---|---|---|---|---|---|---|---|
| 22b30187d826e9eb55b124726e36f8c5c | 5410_NE_A77 | 1 | 5410_NE_A92 | 1 | LINE_A1 | UNLOCKED | ENABLED | 1-A-1-1 | 1-A-1-1 | 1 | 0 | 200000 | OTN |
| 2113e50b9249d670ab382a095a7c64c07 | 5410_NE_A92 | 20 | 5410_NE_A105 | 20 | LINE_B1 | UNLOCKED | ENABLED | 1-A-3-4 | 1-A-3-4 | 2 | 0 | 200000 | OTN |
| 272e6ff2a87832f17da9f29823002eec6 | 5410_NE_A92 | 10 | 5410_NE_A77 | 22 | LINE_B2 | UNLOCKED | ENABLED | 1-A-2-2 | 1-A-3-6 | 0 | 0 | 200000 | OTN |

FIG. 7

DATA SYNCHRONIZATION SYSTEM AND METHODS IN A NETWORK USING A HIGHLY-AVAILABLE KEY-VALUE STORAGE SYSTEM

FIELD OF THE DISCLOSURE

The present disclosure relates generally to network management systems and methods. More particularly, the present disclosure relates to data synchronization systems and methods in a network using a highly-available (HA) key-value storage system.

BACKGROUND OF THE DISCLOSURE

Unless deploying a new network (i.e., a green-field application deployment), introducing SDN products and protocols in the network involves migration from conventional network systems and methods, e.g. control planes, to include hybrid SDN capabilities. Thus, the network must be designed to support SDN protocols on both physical and virtual switching environments, with a management framework to support both SDN and conventional protocols. A hybrid network provides the advantage of offering enterprise Information Technology (IT) a gradual migration from its current network architecture. This means the ability to leverage existing networks without having to rip and replace the network. Hybrid SDN and traditional networking appeals to IT organizations looking to gain the benefits of SDN, which include improved provisioning, network flexibility, Quality of Service (QoS) and programmability during the SDN migration.

Also, in some cases, moving certain control plane functionality from Network Elements (NEs) to an SDN Controller is not feasible, and it is very difficult to meet the performance of the NEs control plane especially in a multi-layer network. So, it is necessary to leverage the existing Layer 1 and Layer 0 Control Plane of the NEs without having to sacrifice the performance. Exemplary control planes may include Automatically Switched Optical Network (ASON) as defined in ITU-T G.8080/Y.1304, Architecture for the automatically switched optical network (ASON) (02/2005), the contents of which are herein incorporated by reference; Generalized Multi-Protocol Label Switching (GMPLS) Architecture as defined in IETF Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween.

Also, there can be a hierarchical dependency for certain applications, in SDN, control planes, or the like. For example, an Element Management System (EMS) can synchronize the data from the Network Elements in the network. A Network Management System (NMS) has to wait for EMS synchronization to complete, and then it synchronizes the data from EMS. Higher-level applications get the network data from the NMS or an SDN Controller. So, for higher-level applications, the EMS and NMS have to be synchronized first. This approach leads into performance and data integrity issues.

BRIEF SUMMARY OF THE DISCLOSURE

In an exemplary embodiment, a data synchronization method, in a network element operating in a network includes generating an event at the network element that needs to be synchronized with other devices in the network; based on assigned tokens for the network element, generating a row key for the event; and providing the row key to a Highly-Available (HA) key-value storage system for synchronization therewith, wherein the HA key-value storage system includes a plurality of nodes including the network element and the other devices. The data synchronization method can further include installing a HA key-value storage system plugin on the network element; and calculating and assigning tokens for the network element, wherein the tokens are based on node key generated from a node identifier of the network element and N-control bits in most significant bits of the key. The row keys can be calculated and assigned for node control plane events, line control plane events, and link control plane events. The data synchronization method can further include registering, a client helper task operating at the network element, with a Common Object Request Broker Architecture (CORBA) Manager on the network element to receive the event relating to a node, a line, or a link event.

The other devices can include a Software Defined Networking (SDN) controller, and wherein the network utilizes a control plane. The SDN controller can synchronize data with the network element through the HA key-value storage system, without polling the network element. The HA key-value storage system can further include any of a Network Management System, an Element Management System, a second SDN controller, and an application. The HA key-value storage system can utilize the assigned tokens to determine where to synchronize data. The assigned tokens in the HA key-value storage system can be logically in a ring such that a node with a lowest token also accepts row keys less than the lowest token and more than the highest token. The assigned tokens can be hash based tokens generated to avoid duplication in the nodes.

In another exemplary embodiment, a network element, operating in a network, with data synchronization includes at least one port forming a link in the network; and a controller communicatively coupled to the at least one port, and wherein the controller is further configured to: generate an event that needs to be synchronized with other devices in the network, based on assigned tokens for the network element, generate a row key for the event, and provide the row key to a Highly-Available (HA) key-value storage system for synchronization therewith, wherein the HA key-value storage system includes a plurality of nodes including the network element and the other devices. The controller can be further configured to install a HA key-value storage system plugin on the network element; and calculate and assign tokens based on node key generated from a node identifier of the network element. The assigned tokens can be applied for node control plane events, line control plane events, and link control plane events. The controller can be further configured to register, a client helper task operating on the controller, with a Common Object Request Broker Architecture (CORBA) Manager on the controller to receive the event relating to a node, a line, or a link event and generating row key for the data that needs to be synchronized.

A Software Defined Networking (SDN) controller can synchronize data with the network element through the HA key-value storage system, without polling the network element. The other devices can include any of a Network Management System, an Element Management System, a Software Defined Networking (SDN) controller, and an application. The HA key-value storage system can utilize the assigned tokens to determine where to synchronize data. The assigned tokens in the HA key-value storage system can be logically in a ring such that a node with a lowest token also accepts row keys less than the lowest token and more than the highest token.

In a further exemplary embodiment, a Software Defined Networking (SDN) controller communicatively coupled to a control plane network includes a network interface; a data store; a processor communicatively coupled to the network interface and the data store; and memory storing computer executable instructions, and in response to execution by the processor, the computer executable instructions cause the processor to receive, via the network interface, a row key from a network element operating in a Highly-Available (HA) key-value storage system with the SDN controller, wherein the row key is computed based on assigned tokens to the network element, and store, in the data store, data in the row key for the network element; wherein the HA key-value storage system includes a plurality of nodes including the network element and the SDN controller. The SDN controller can synchronize data with the network element through the HA key-value storage system, without polling the network element.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 6 is a table of row keys and information in the HA key-value storage system cluster for links;

FIG. 7 is a table of row keys and information in the HA key-value storage system cluster for lines;

DETAILED DESCRIPTION OF THE DISCLOSURE

In various exemplary embodiments, data synchronization systems and methods are described using a HA key-value storage system, such as between an SDN and a control plane. The data synchronization systems and methods remove the overhead of the SDN Controller or any other device (e.g., NMS, EMS, etc.) synchronizing with the network using a process of discovery and maintaining an up-to-date database. The data synchronization systems and methods use a topology database of the network elements in a distributed fashion. Each NE and network device has a highly available key-value storage system instance, which acts as a node in a cluster. This system instance interfaces with existing NE control plane components to access the network topology/ link database and maps to a key-value storage system data model. The SDN Controller/NMS also has a key-value storage system instance, which acts as another node in the cluster. The data synchronization systems and methods enable dynamic synchronization of network topology and node/link state information. Also, this enables asynchronous, master-less replication thereby allowing low latency operations for all clients. This is not just limited to network topology/link database. Any data in the NE (Equipment, Facility, Cross Connects, connections such as Subnetwork Connections (SNCs) or Label Switched Paths (LSPs), Designated Transit Lists (DTLs) or Explicit Route Objects (ERO), etc.) can be synchronized dynamically.

Figure 1:
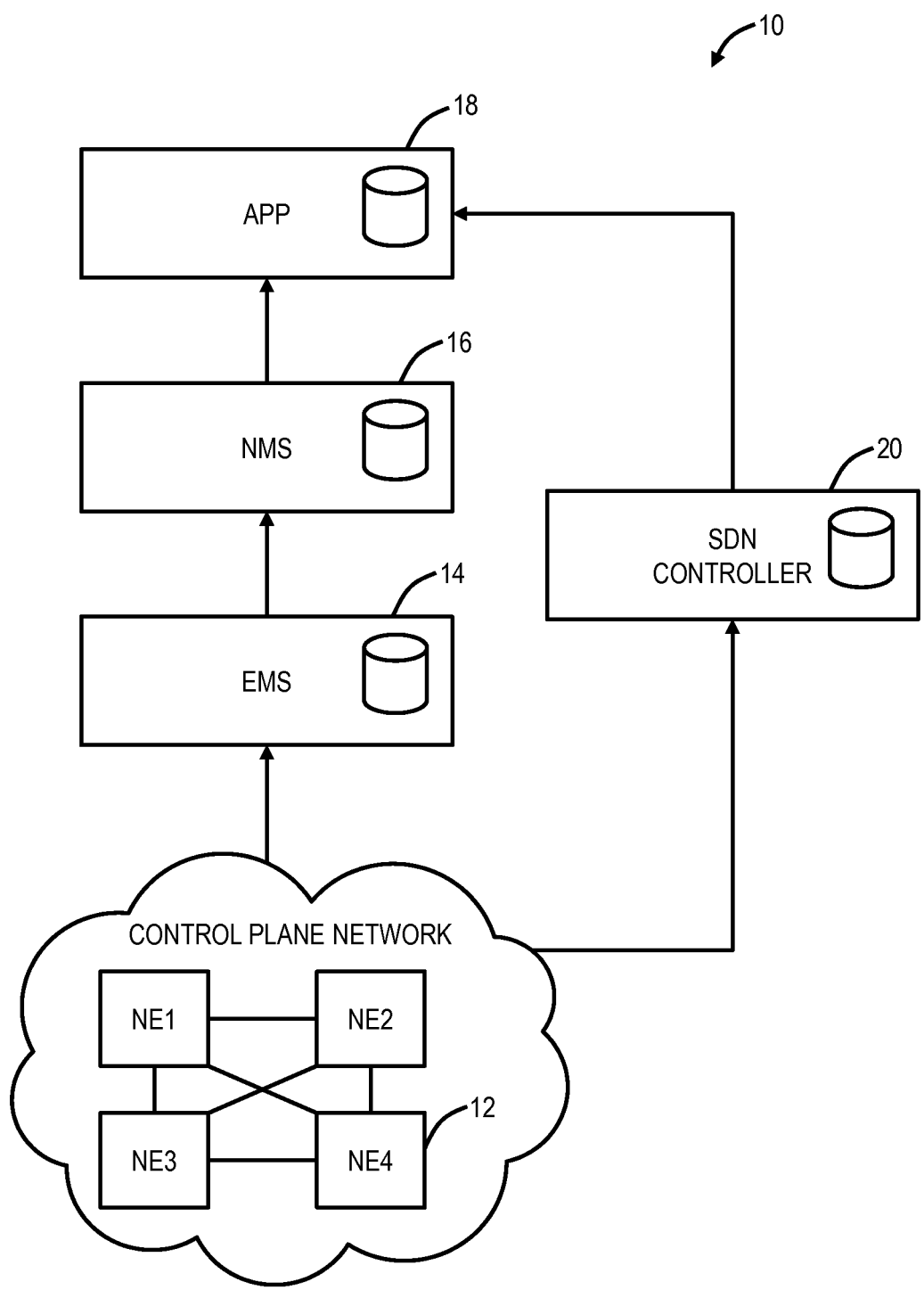
FIG. 1 is a network diagram of a hybrid SDN network with a plurality of network elements.

Referring to FIG. 1, in an exemplary embodiment, a network diagram illustrates a hybrid SDN network 10 with a plurality of network elements 12. The hybrid SDN network 10 is a network where both traditional networking and SDN protocols operate in the same environment. The hybrid SDN network 10 allows network engineers to introduce new SDN technologies like OpenFlow to legacy environments without a complete overhaul of the network architecture. In a hybrid SDN, the hybrid SDN network 10 can run SDN technologies and standard switching protocols simultaneously on the physical hardware. Specifically, the hybrid SDN network 10 can be communicatively coupled to an EMS 14, an NMS 16, one or more apps 18, and an SDN controller 20. The EMS 14 and the SDN controller 20 can be communicatively coupled to the network elements 12. The NMS 16 can synchronize data with the EMS 14, and the apps 18 can synchronize data with the NMS 16 and/or the SDN controller 20. Note, in some embodiments, there may only be the EMS 14 or the NMS 16.

In the hybrid SDN network 10, the EMS 14 or the NMS 16 can configure the SDN control plane to discover and control certain traffic flows while traditional, distributed control plane protocols continue to direct the rest of the traffic on the hybrid SDN network 10. In an exemplary embodiment, the hybrid SDN network 10 includes a control plane, e.g., OSRP, ASON, GMPLS, etc., for Layer 0 (Dense Wave Division Multiplexing (DWDM)) and Layer 1 (OTN/ SONET/SDH) connections. Control planes are configured to establish end-to-end signaled connections such as Subnetwork Connections (SNCs) in ASON or OSRP and Label Switched Paths (LSPs) in GMPLS and MPLS. Control planes use the available paths to route the SNCs/LSPs and program the underlying hardware accordingly. The control plane can be a distributed protocol designed for controlling a mesh network of optical cross-connects (OXCs). The control plane performs automatic resource discovery, distributes network resource information, and establishes and restores connections dynamically across the network. Advantageously, the control plane introduces intelligence in the optical transport system, making it more flexible, survivable and amenable to traffic engineering.

A control plane logically includes two components: a routing protocol and a signaling protocol. The routing protocol can be a link-state routing protocol, which considers routing parameters specific to the optical transport domain. Its function is to distribute network topology and state information amongst other network elements 12 in the network 10, so that, the network elements 12 may determine optimal routes based on an administrative policy defined by the user. The signaling portion provides the mechanism to perform connection setup, teardown, and modification capabilities. Since the control plane is distributed, each network element 12 in the network can be said to operate a control plane instance. At the heart of instances of the control plane are the following protocols and algorithms:

Neighbor Discovery—This protocol is used by control plane instances to discover neighboring control plane instances connected via control plane lines, as well as discover their remote information (nodal, line and link). Note, a link is a physical connection between the network elements 12 whereas a line is a virtual connection, e.g., SNC, LSP, etc.

Routing Protocol—This protocol is used by every control plane instances to discover the entire network topology, i.e. all control plane instances and interconnecting links in the entire network 10, and to keep such topology in synch and up-to-date in order to facilitate dynamic computation and validation of connection routes.

Route Computation and Validation—A collection of algorithms, e.g., Dijkstra-based algorithms, for dynamically calculating or validating routes for connections while considering various constraints.

Signaling Protocol—This protocol is used to create and terminate connections on a network element by network element basis.

In various exemplary embodiments, the data synchronization systems and methods treat the hybrid SDN network 10 and all associated components as nodes in a distributed database management system. Specifically, each of the network elements 12, the EMS 14, the NMS 16, the apps 18, and the SDN controller 20 are all nodes operating in the distributed database management system with a key storage system. The nodes use a key-value storage system. Key-value (KV) stores use the associative array (also known as a map or dictionary) as their fundamental data model. In this model, data are represented as a collection of key-value pairs, such that each possible key appears at most once in the collection. In an exemplary embodiment, the hybrid SDN network 10 can utilize a Dynamo highly available key-value structured storage system or a distributed data store, such as Apache Cassandra. That is, the hybrid SDN network 10 can use Cassandra/Highly-Available Key-Value Storage System as distributed database management system in order to access the data centralized SDN Controller. 20.

Apache Cassandra is an open source distributed database management system designed to handle large amounts of data across many commodity servers, providing high availability with no single point of failure. Cassandra offers robust support for clusters spanning multiple data centers, with asynchronous master-less replication, allowing low latency operations for all clients. Cassandra also places a high value on performance. University of Toronto researchers studying NoSQL (Not Only Structured Query Language) systems concluded that "In terms of scalability, there is a clear winner throughout our experiments. Cassandra achieves the highest throughput for the maximum number of nodes in all experiments." Cassandra's data model is a partitioned row store with tunable consistency. Rows are organized into tables; the first component of a table's primary key is the partition key; within a partition, rows are clustered by the remaining columns of the key. Other columns may be indexed separately from the primary key.

Tables may be created, dropped, and altered at runtime without blocking updates and queries. Main features include:

Decentralized

Every node in the cluster has the same role. There is no single point of failure. Data is distributed across the cluster (so each node contains different data), but there is no master as every node can service any request.

Supports replication and multi data center replication

Replication strategies are configurable. Cassandra is designed as a distributed system, for deployment of large numbers of nodes across multiple data centers. Key features of Cassandra's distributed architecture are specifically tailored for multiple-data center deployment, for redundancy, for failover and disaster recovery.

Scalability

Read and write throughput both increase linearly as new machines are added, with no downtime or interruption to applications.

Fault-tolerant

Data is automatically replicated to multiple nodes for fault-tolerance. Replication across multiple data centers is supported. Failed nodes can be replaced with no downtime.

Tunable consistency

Writes and reads offer a tunable level of consistency, all the way from "writes never fail" to "block for all replicas to be readable", with the quorum level in the middle.

MapReduce support

Cassandra has Hadoop (an open-source software framework for storage and large-scale processing of datasets on clusters of commodity hardware) integration, with MapReduce (a programming model and an associated implementation for processing and generating large data sets with a parallel, distributed algorithm on a cluster) support. There is also support for Apache Pig (a high-level platform for creating MapReduce programs used by Hadoop) and Apache Hive (a data warehouse infrastructure built on top of Hadoop for providing data summarization, query, and analysis).

Query language

CQL (Cassandra Query Language) was introduced, a SQL-like alternative to the traditional RPC interface. Language drivers are available for Java (JDBC), Python (DBAPI2) and Node.JS (Helenus).

Data partitioning determines how data is distributed across the nodes in the cluster. Three factors are involved with data distribution:

A partitioner that determines which node to store the data on;

The number of copies of data, which is determined by the replica placement strategy; and The topology of the cluster, which is the number of nodes, the distribution of the nodes on racks, and the number of data centers.

Column family data is partitioned across the nodes based on a row key. To determine the node where the first replica of a row will live, the ring is traversed clockwise until it locates the node with a token value greater than that of the row key. Each node is responsible for the region of the ring between itself (inclusive) and its predecessor (exclusive). With the nodes sorted in token order, the last node is considered the predecessor of the first node; hence the ring representation.

Figure 2:
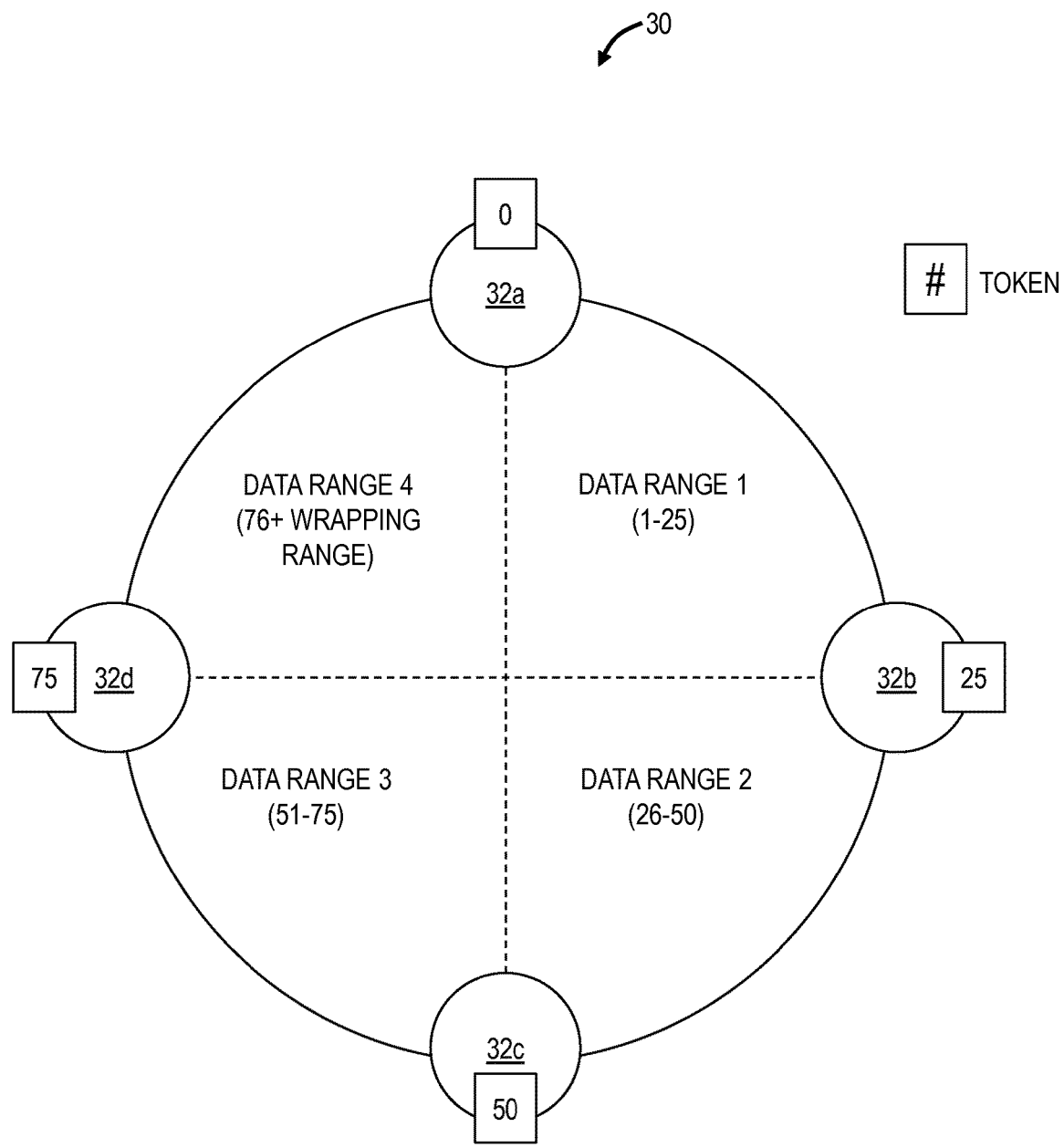
FIG. 2 is a diagram of a four node cluster with four nodes in an exemplary distributed database management system.

Referring to FIG. 2, in an exemplary embodiment, a diagram illustrates a four node cluster 30 with four nodes 32a-32d in an exemplary distributed database management system. Note, in this example, the nodes 32a-32d are logically elements in the hybrid SDN network 10. For example, the node 32a can be the SDN controller 20, the node 32b can be the network elements 12, the node 32c can be the EMS 14, and the node 32d can be the NMS 16. In the four node cluster 30, all of the row keys managed are numbers in the range of 0 to 100. Each node 32a-32d is assigned a token that represents a point in this range. In this simple example, the token values are 0, 25, 50, and 75. The first node 32a, the one with token 0, is responsible for the wrapping range (75-0). The node 32a with the lowest token also accepts row keys less than the lowest token and more than the highest token.

To achieve high availability and durability, the four node cluster 30 replicates its data on the nodes 32a-32d. In a generalized system, there are N nodes, and each data item is replicated at the N nodes, where N is a parameter configured "per-instance". Each key, k, is assigned to a coordinator node which is in charge of the replication of the data items that fall within its range. In addition to locally storing each key within its range, the coordinator node replicates these keys at the N−1 clockwise successor nodes in the ring. This results in a system where each node 32 is responsible for the region of the ring between it and its Nth predecessor.

The list of nodes that is responsible for storing a particular key is called the preference list. The distributed database management system is designed, so that every node in the distributed database management system can determine which nodes should be in this list for any particular key. To account for node failures, the preference list contains more than N nodes. Note that with the use of virtual nodes, it is possible that the first N successor positions for a particular key may be owned by less than N distinct physical nodes (i.e. a node may hold more than one of the first N positions). To address this, the preference list for a key is constructed by skipping positions in the ring to ensure that the list contains only distinct physical nodes.

When comparing the distributed database management system to a relational database, the column family is similar to a table in that it is a container for columns and rows. However, a column family requires a major shift in thinking from the relational world. In a relational database, tables are defined, which have defined columns. The table defines the column names and their data types, and the client application, then supplies rows conforming to that schema: each row contains the same fixed set of columns.

In the distributed database management system, column families are defined. Column families can define metadata about the columns, but the actual columns that make up a row are determined by the client application. Each row can have a different set of columns. There are two types of column families:

Static column family: Typical Cassandra column family design.

Dynamic column family: Use with a custom data type.
Column families include these kinds of columns:

Standard: Has one primary key.

Composite: Has more than one primary key, recommended for managing wide rows.

Expiring: Gets deleted during compaction.

Counter: Counts occurrences of an event.

Super: Used to manage wide rows, inferior to using composite columns.

Although column families are very flexible, in practice a column family is not entirely schema-less.

In designing column families, each row of a column family is uniquely identified by its row key, similar to the primary key in a relational table. A column family is partitioned on its row key, and the row key is implicitly indexed. A static column family uses a relatively static set of column names and is similar to a relational database table. For example, a column family storing user data might have columns for the user name, address, email, phone number and so on. Although the rows generally have the same set of columns, they are not required to have all of the columns defined. Static column families typically have column metadata pre-defined for each column.

Generally, the data synchronization systems and methods include assigning each network element, the controller, EMS, NMS, etc. a key; each of the network elements, controller, EMS, NMS, etc. are a node in a Highly Available (HA) key-value storage system cluster. When data needs to be synchronized by a node in the cluster, a hash-based token is generated such that the data gets stored in the cluster without duplication. Specific to a control plane network, the hash-based tokens are based on row keys for nodes, lines, and links—nodes are network elements or the controllers, lines are virtual connections (e.g., OTN, DWDM, SONET, Ethernet, etc.), and links are physical connections, i.e. optical fiber.

Figure 3:
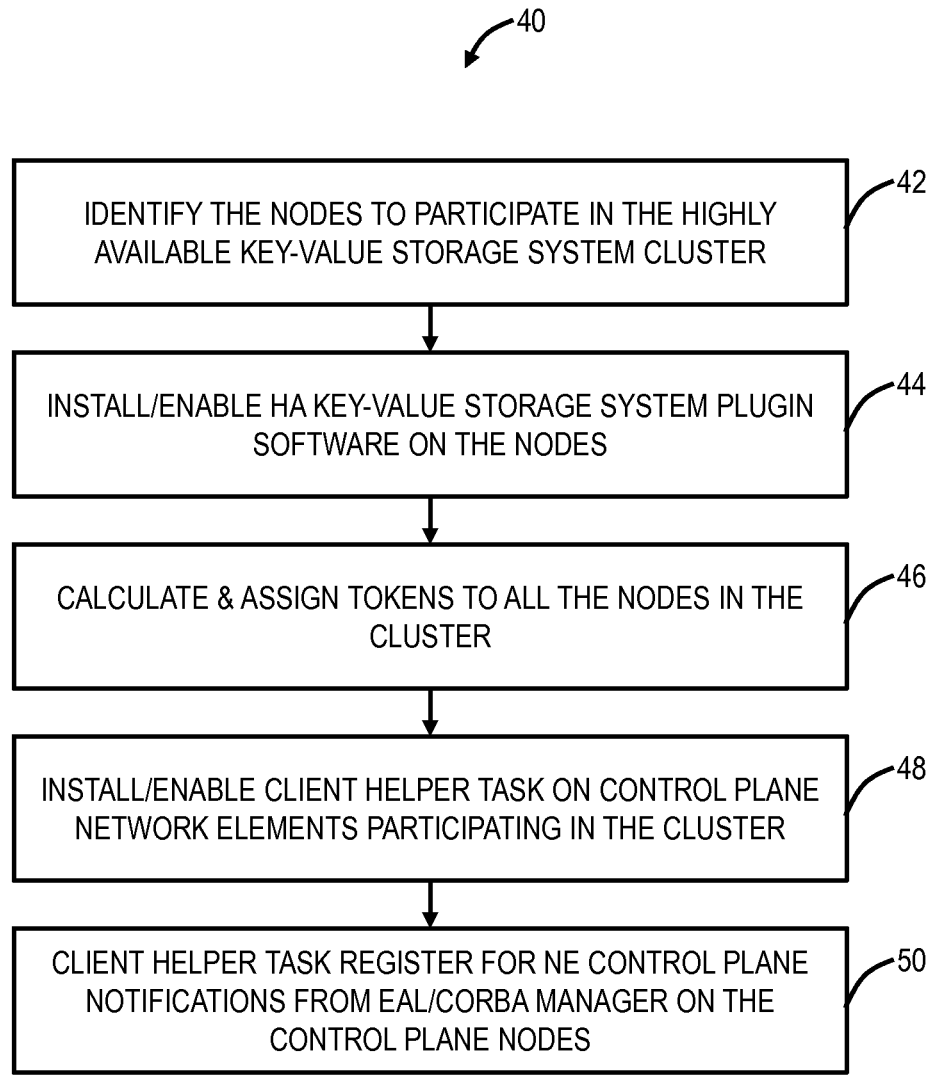
FIG. 3 is a flow chart of a configuration process for nodes in the hybrid SDN network.

Referring to FIG. 3, in an exemplary embodiment, a flow chart illustrates a configuration process 40 for nodes in the hybrid SDN network 10. Again, the nodes in the hybrid SDN network 10 are the network elements 12, the EMS 14, the NMS 16, the apps 18, and the SDN controller 20. That is, the nodes, in a distributed database management system, for the hybrid SDN network 10 or any element or device that needs to exchange and synchronize data. The nodes are not simply the network elements 12, but also the software platforms such as the EMS 14, the NMS 16, the apps 18, and the SDN controller 20. The distributed database management system can also be referred to as a highly available key-value storage system cluster. The configuration process 40 includes identifying the nodes to participate in the Highly Available (HA) key-value storage system cluster (step 42).

The configuration process 40 includes installing/enabling a HA key-value storage system plugin software on the nodes (step 44), and calculating and assigning tokens to all the nodes in the cluster (step 46). The configuration process 40 includes installing/enabling a client helper task on control plane network elements 12 participating in the cluster (step 48). The client helper task registers for network element control plane notifications from a system on the network element 12 for Events, Alarms, and Logging (EAL) or a Common Object Request Broker Architecture (CORBA) Manager on the control plane network elements 12 (step 50).

Figure 4:
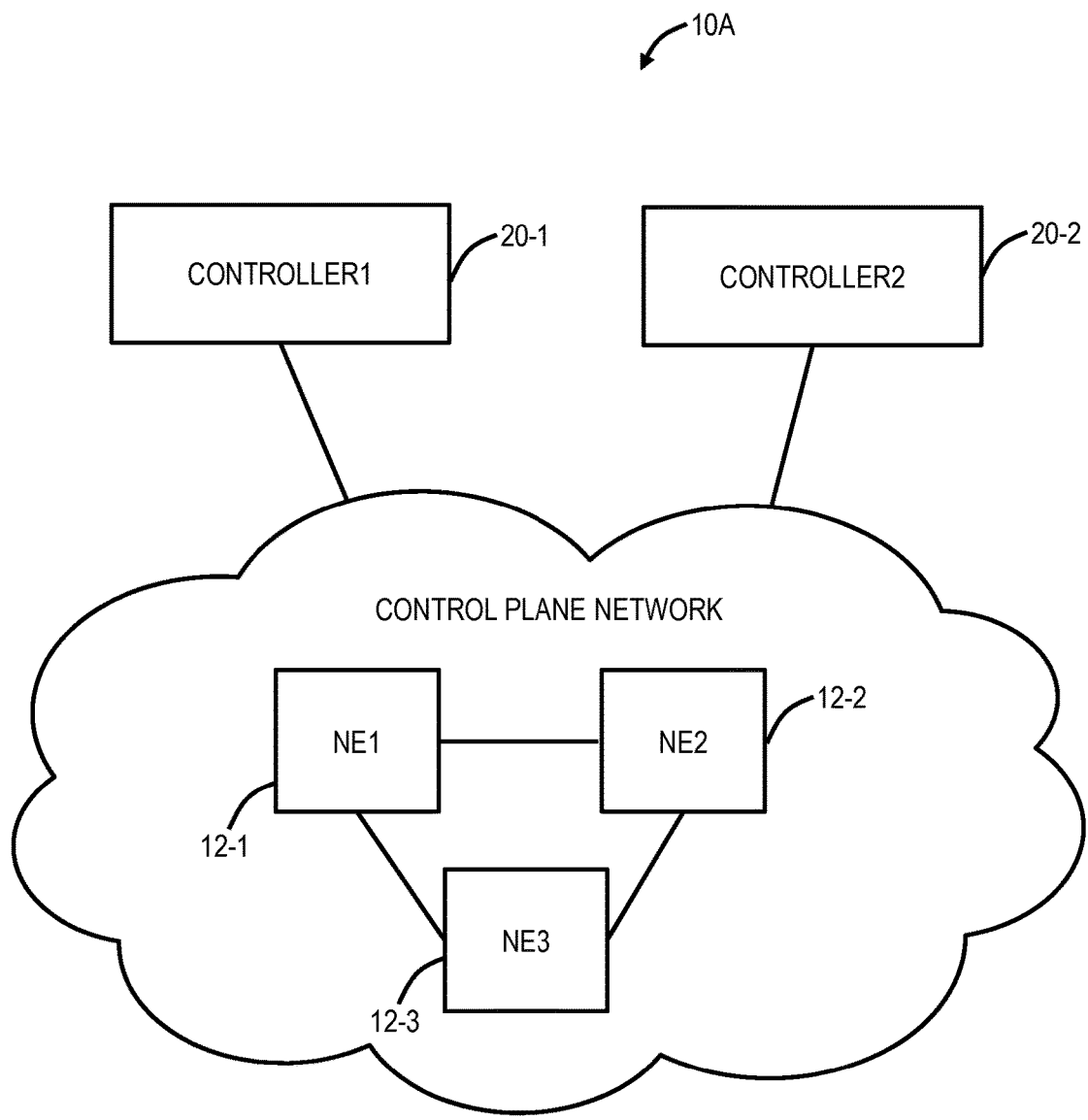
FIG. 4 is a network diagram of a network for describing a token assignment in a Highly-Available (HA) key-value storage system cluster.

Referring to FIG. 4, in an exemplary embodiment, a network diagram illustrates a network 10A for describing a token assignment in a HA key-value storage system cluster. The network 10A includes network elements 12-1, 12-2, 12-3 which are configured to operate a control plane and two controllers 20-1, 20-2 communicatively coupled to the network elements 12-1, 12-2, 12-3. For example, the network element 12-1 has a node ID of 5430-NE-A92, the network element 12-2 has a node ID of 5410-NE-A77, and the network element 12-3 has a node ID of 5410-NE-A105. For each of the network elements 12-1, 12-2, 12-3, the token is derived from the node ID.

For example, the network element 12-1, with the node ID of 5430-NE-A92, is 50a0450000000100 010001000100920000000ffff00, in the control plane. The Message-Digest 5 (MD5) hash algorithm can be used to get the hash value of the network element 12-1. For the node with node ID 50a0450000000100 010001000100920000000ffff00, the MD5 hash code value is 1647562bc730a9324e3712cd60d231c3. Three control bits (001) can be prepended to the above hash in order to generate the token of the node. So, for the network element 12-1, the token will be 11647562bc730a9324e3712cd60d231c3. Similarly for the network element 12-2 with the node ID 5410-NE-A77 with a control plane ID of 50a045000000010001 00010001007700000000ffff00, the token will be 13d81e336aa99f40d555939d9fe572b99. Similarly for the network element 12-3 with the node ID 5410-NE-A105 with a control plane ID of 50a04500000001000100 01000101050000000ffff00, the token will be 10c7e6b2c3f1fa5663bc2c57acf895319.

For the controller 20-1, an ID of ffffffffffffffffffffffffffffffff00 can be used. With that value, the hash is a0be4cfd1d5f3544ac399be44304834c. Three control bits (111) will be prepended to the hash value to generate the token for the controller. So, the token will be 7a0be4cfd1d5f3544ac399be44304834c. Using this approach, the token value of the controller 20-1 will be always higher than the other nodes in the cluster. With this, the controller 20-1 can have a controller 20-1 key of 111+XXXX . . . where XXXX . . . is the hash code generated from the ID ffffffffffffffffffffffffffffffff00. Note, the controller 20-2 is optional, in multi-controller scenarios), and the controller 20-1 may be an SDN controller, but the controller 20-2 does not have to be an SDN controller. For example, the controller 20-2 can be the EMS 14, the NMS 16, or the apps 18, anything which needs control plane data synchronized and stored. The controller 20-2 can have an ID of ffffffffffffffffffffffffffffffff01 and a controller 20-2 key of 110+XXXX . . . where XXXX . . . is the hash code generated from the ID ffffffffffffffffffffffffffffffff01. Similarly, the key for the network elements 12 can be 001+XXXX . . . where XXXX . . . is the hash code generated from the node ID of the network element 12.

Figure 5:
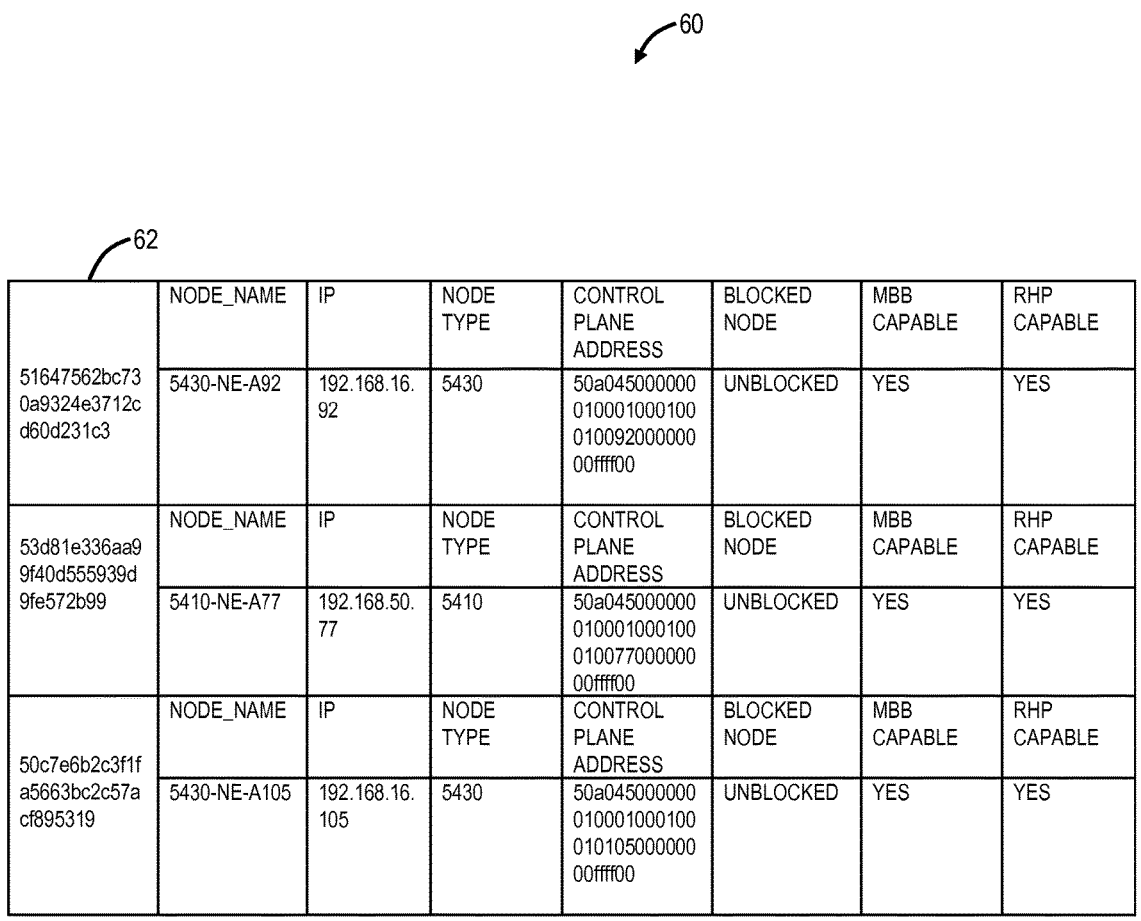
FIG. 5 is a table of node information on the network elements of the network of FIG. 4 in the HA key-value storage system cluster.

Referring to FIG. 5, in an exemplary embodiment, a table 60 illustrates node information of the network elements 12-1, 12-2, 12-3 in the HA key-value storage system cluster. The first column of the table 60 includes row keys 62, for the network elements 12, and the remaining columns include information such as node name, IP address, node type, control plane address, blocked node, Make-Before-Break (MBB) capable, or RHP capable. The row keys 62 are derived from the node ID. The row keys 60 can be 101+ XXXX . . . where XXXX . . . is the hash code generated from the node ID of the network element 12. For example, for the network element 12-1 with the control plane ID 50a045000000010001000100100920000000ffff00, the row key will be 51647562bc730a9324e3712cd60d231c3. Similarly for the network element 12-2 with the control plane ID 50a0450000000100010 0010010077000000000ffff00, the row key will be 53d81e336aa99f40d555939d9fe572b99. Similarly for the node network element 12-2 with the control plane ID 50a04500000001000100010010105000000000ffff00, the row key will be 50c7e6b2c3f1fa5663bc2c57acf895319.

So, the row keys for all the above entries are higher the tokens of the network element 12-1 (11647562bc730a9324e3712cd60d231c3), the network element 12-2 (13d81e336aa99f40d555939d9fe572b99), the network element 12-2 (10c7e6b2c3f1fa5 663bc2c57acf895319), and lower than the controller 20-2 token (7a0be4cfd1d5f3544ac399be44304834c). So, the data entries will be stored in controller 20-1.

Row keys for a control plane line column can be derived based on 100+MD5(Control Plane Node ID+Originating Link ID). For example, for link 1 originating from the network element 12-2, the control plane node ID is 50a045000000010001000100010077000000000ffff00, the originating link ID is 1;
Control Plane Node ID+Originating Link ID=50a04500000001000100010001007700000000 ffff001;
MD5(Control Plane Node ID+Originating Link ID)=4d19acf8ab28c5b067e34ec65869d27a
Row Key=100+MD5(Control Plane Node ID+Originating Link ID)=44d19acf8ab28c5b067e34ec65869d27a.

Similarly, for the link 20 originating from network element 12-1, the row key will be 403c7e7f46b6ad7a25b5a17fe90241087. Similarly, for the link 10 originating from network element 12-1, the row key will be 46f8f229fe76010daae7c3e845261b790.

Referring to FIG. 6, in an exemplary embodiment, a table 70 illustrates row keys 72 and information in the HA key-value storage system cluster for links. The table 70 includes the row keys 72 for the links, which are physical connections in the network 10, i.e. optical connections. The table 70 includes information for the links such as originating node, originating link, terminal node, terminal link, label, state, administrative weight, bundle ID, service type, is it master, maximum bandwidth, available bandwidth, and delay. So, the row keys for all the above entries are higher the tokens of the network element 12-1 (11647562bc730a9324e3712cd60d231c3), the network element 12-2 (13d81e336aa99f40d555939d9fe572b99), the network element 12-3 (10c7e6b2c3f1fa56 63bc2c57acf895319) and lower than the controller 20-1 token (7a0be4cfd1d5f3544ac399be44304834c). So, the data entries will be stored in the controller 20-1.

Referring to FIG. 7, in an exemplary embodiment, a table 80 illustrates row keys 82 and information in the HA key-value storage system cluster for lines. The table 80 includes the row keys 82 for the lines, which are virtual or physical connections on the links in the network 10, i.e. Optical Transport Network (OTN) connections. The row keys can be derived using 010+MD5(Control Plane Node ID+Line Access Identifier (AID)). For example, for the line 1-A-1-1 originating from the network element 12-2, the row key will be calculated as follows:
The Control Plane Node ID=50a0450000000100 010001000100770000000ffff00;
The line AID=1-A-1-1, so it will be 1A11;
Control Plane Node ID+Line AID+Line AID=50a04500000001000100010001007700000000 ffff001A11;
MD5(Control Plane Node ID+Line AID)=2b30187d826e9eb55b124726e36f8c5c;
Row Key=010+MD5(Control Plane Node ID+Line AID)=22b30187d826e9eb55b124726e36f8c5c. Similarly, for the line 1-A-3-4 originating from network element 12-1, the row key will be 2113e50b9249d670ab382a095a7c64c07. Similarly, for the line 1-A-2-2 originating from the network element 12-1, the row key will be 272e6ff2a87832f17da9f29823002eec6.

The table 80 includes information for the lines based on the row keys 82 such as originating node, originating link, terminal node, terminal link, label, admin state, operational state, line AID, terminal line AID, communication, out-of-band communication, delay, and service type. So, the row keys for all the above entries are higher the tokens of the network element 12-1 (11647562bc730a9324e3712cd60d231c3), the network element 12-2 (13d81e336aa99f40d555939d9fe572b99), the network element 12-3 (10c7e6b2c3f1fa5663bc2c57acf895319) and lower than the controller 20-1 token (7a0be4cfd1d5f3544ac399be44304834c). So, the data entries will be stored in the controller 20-1 node.

Figure 8:
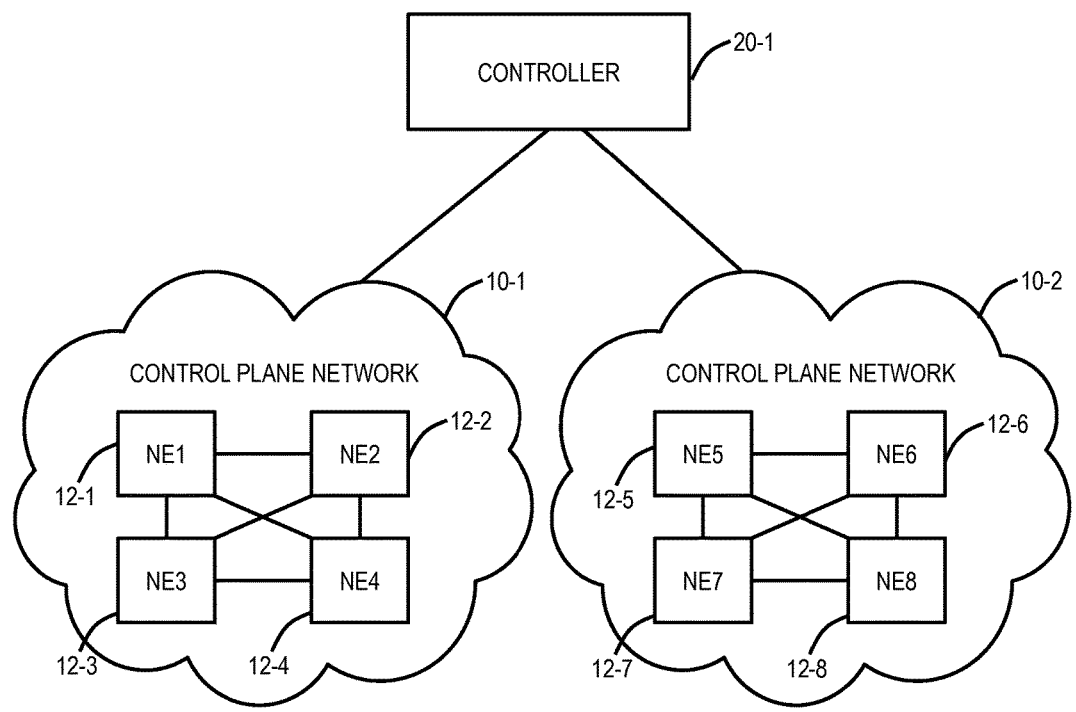
FIG. 8 is a network diagram of isolated control plane networks.

Referring to FIG. 8, in an exemplary embodiment, a network diagram illustrates isolated control plane networks 10-1, 10-2 Similarly, the several isolated control plane networks 10-1, 10-2 can be part of the same cluster using the single controller 20-1 (with optional second controller 20-2). In the following example of FIG. 8, there are the two control plane networks 10-1, 10-2 managed by the singe SDN controller 20-1. The control plane network 20-1 includes network elements 12-1, 12-2, 12-3, 12-4 and the control plane network 20-2 includes network elements 12-5, 12-6, 12-7, 12-8. Not all the network elements 12 in the control plane networks 10-1, 10-2 need to be part of the cluster since all the network elements 12 contain the corresponding control plane network topology information. So, it is up to the administrator to configure how many of the network elements 12 in the control plane networks 10-1, 10-2 are part of the cluster.

The network element 12 that is part of the cluster has a component running which is responsible for listening/accessing the control plane node, link, and line events and updates from the control plane and mapping the same information into the HA key-value storage system specific data model feeding to the HA key-value storage system instance running on the network element 12.

In FIG. 8, if network elements 12-1, 12-2 are configured to be part of the cluster from control plane network 10-1 and the network elements 12-5, 12-6 are configured to be part of the cluster from the control plane network 10-2, then the cluster would behave the following way. For example, if the control plane node IDs of the network elements are as follows, NE 12-1 control plane Node ID=50a0450000000 10001000100010092000000000ffff00;
NE 12-2 control plane Node ID=50a0450000000100 01000100010077000000000ffff00;
NE 12-5 control plane Node ID=50a045000000 01000100010001010500000000ffff00; and
NE 12-6 control plane Node ID=50a0450000 00010001000100010062000000000ffff00.

Using MD5 Hash algorithm, token of the network elements 12 will be:
NE 12-1 Token=11647562bc730a9324e3712cd60d231c3;
NE 12-2 Token=13d81e336aa99f40d555939d9fe572b99;
NE 12-5 Token=10c7e6b2c3f1fa5663bc2c57acf895319;
NE 12-6 Token=13efd22a185c925a018b9b3aef79af5dd; and
the controller 20-1 token=7a0be4cfd1d 5f3544ac399be44304834c.

Figure 9:
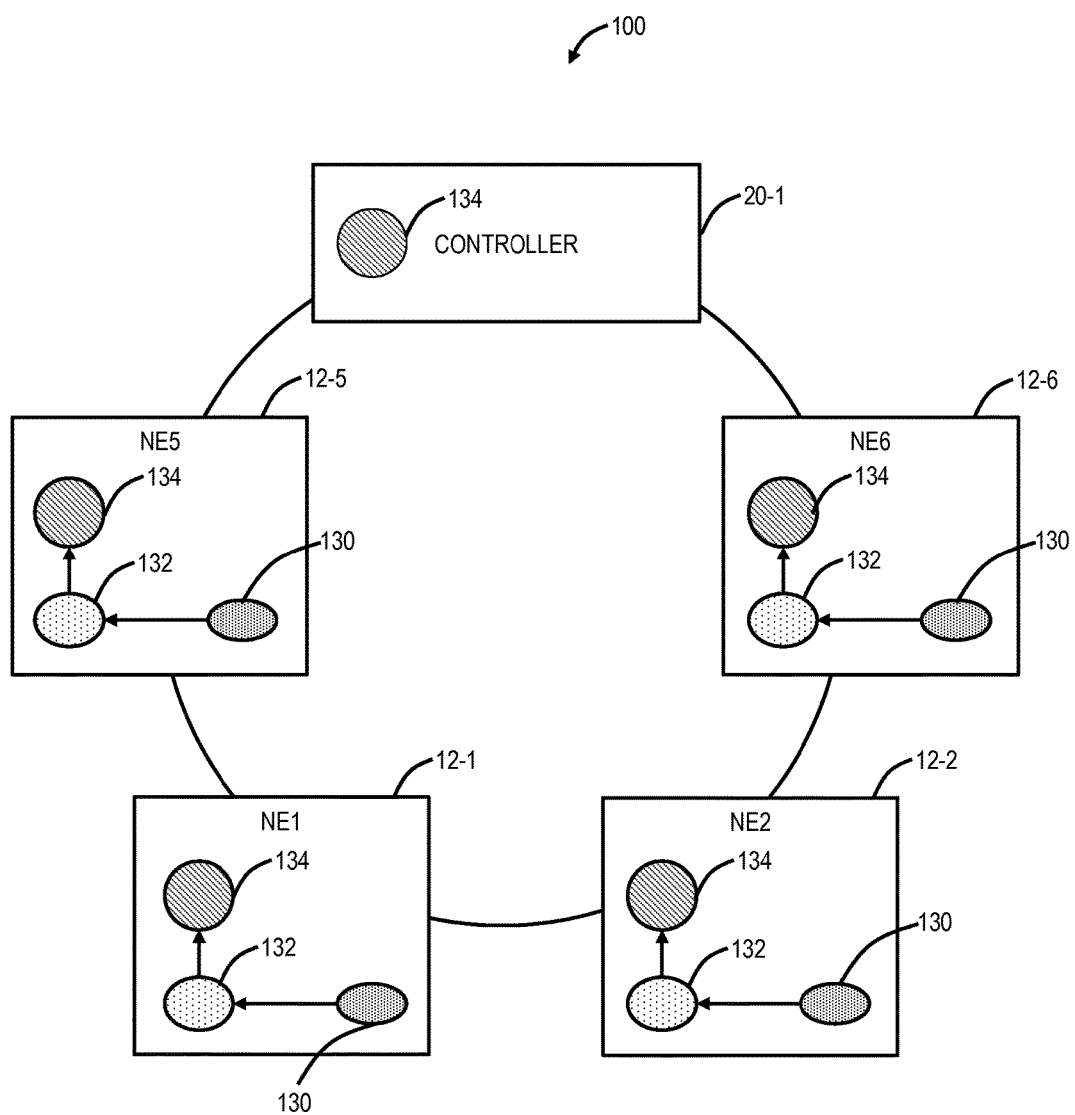
FIG. 9 is a network diagram of a HA key-value storage cluster ring based on the control plane networks of FIG. 8.
Figure 10:
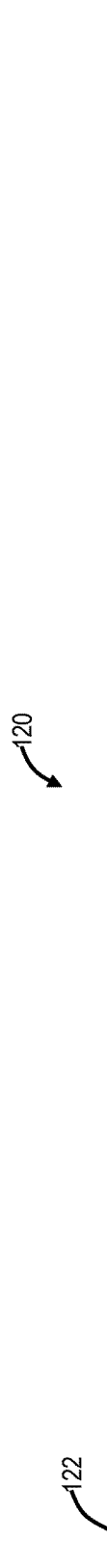
FIG. 10 is a table of information for the network element in the ring of FIG. 9.

Referring to FIG. 9, in an exemplary embodiment, a network diagram illustrates a HA key-value storage cluster ring 100 based on the control plane networks 10-1, 10-2. The order of these nodes in the ring would be network element 12-5, 12-1, 12-2, 12-6, and the controller 20-1 (in the ascending order). Referring to FIG. 10, in an exemplary embodiment, a table 120 illustrates information for the network element 12-1, 12-2, 12-5, 12-6 in the ring 100. The table 120 is similar, with respect to information, as the table 60. The row keys for all the above entries are higher the tokens of the network element 12-1 (11647562bc730a9324e3712cd60d231c3), the network element 12-2 (13d81e336aa99f40d555939d9fe572b99), the network element 12-5 (10c7e6b2c3f1fa5663bc2c57acf895319), the network element 12-6 (13efd22a185c925a018b9b3aef79af5dd) and lower than the controller 20-1 token (7a0be4cfd1d5f3544ac399be44304834c). So, the data entries will be stored in controller 20-1.

Figure 11:
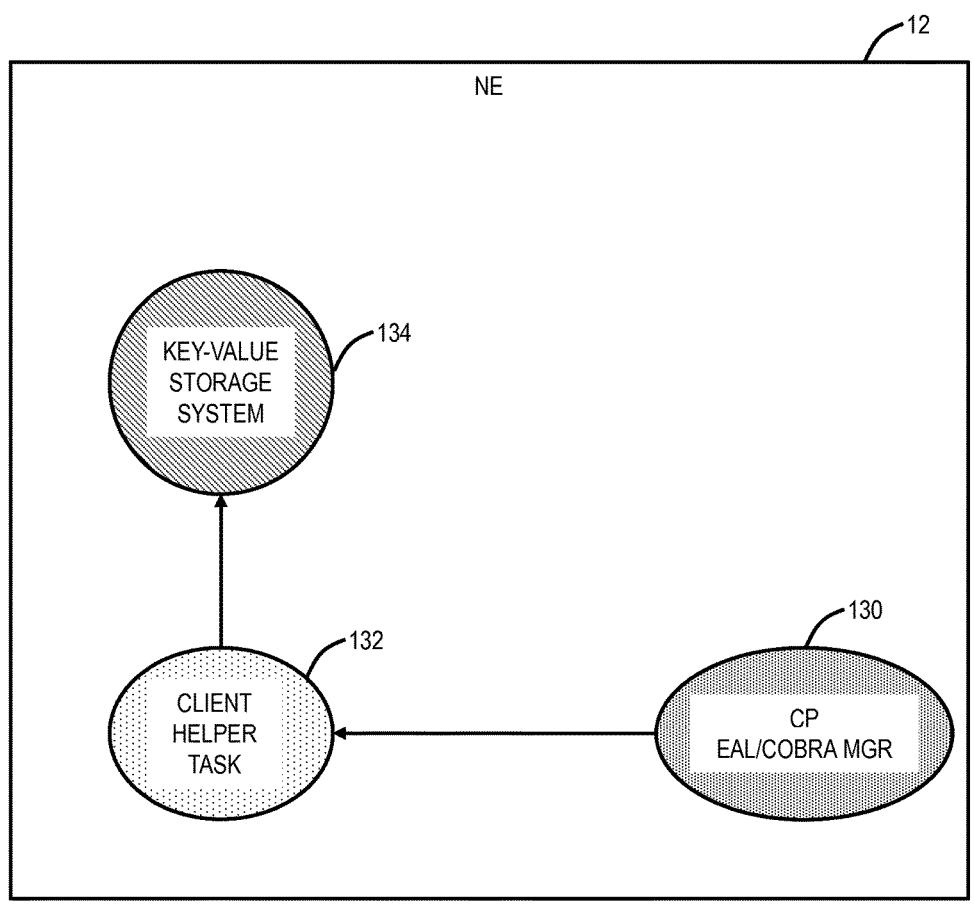
FIG. 11 is a block diagram of a network element with associated functionality for operating in the HA key-value storage cluster ring of FIG. 9.

Referring to FIG. 11, in an exemplary embodiment, a block diagram illustrates a network element 12 with associated functionality for operating in the HA key-value storage cluster ring 100. Note, additional components of an exemplary network element 12 are described in FIGS. 13 and 14. Functionally, the network element 12 includes a control plane manager 130 which is configured as an EAL or CORBA Manager that sends new events to a client helper task 132 which provides such events to a key-value storage system 134.

Control plane routing is responsible for the discovery and on-going dissemination of resource information throughout the network 10-1, 10-2. The term resources refer to physical network components such as optical cross-connects and physical interfaces or facilities between optical cross-connects. Control plane routing is capable of automatically discovering the addition or removal of these resources from the network 10-1, 10-2. This information is used to determine the network topology for route determination. Auto discovery of resources eliminates any manual configuration of connectivity of optical cross-connects, ensuring an accurate and consistent view of the resources in the network 10-1, 10-2.

The control plane routing information can be exposed to management through a CORBA Extensible Markup (XML)/Transaction Language 1 (TL1)/Simple Network Management Protocol (SNMP) interface. Clients interested in receiving updates can register with the control plane manager 130 for different Managed Objects (MO). For example, there can three managed objects node, line, and link MOs defined to support routing resources. The node MO is related to the network element 12, the line MO is related to the connections associated with the network element 12, and the link MO is related to the physical link connected to the network element 12. Autonomous change events are generated by the control plane manager 130 to update changes in resources caused by failure or creation of new on-demand circuit(s).

The client helper task 132 registers for node, line, and link notifications from the control plane manager 130. The client helper task 132 converts managed object data to consistent key hashing as defined in the previous section and invokes a write operation to the key-value storage system 134 to update modified object(s) value to the key-value storage system 134 cluster using replica synchronization protocol. This information will get updated to controller(s) 20-1, 20-2 through a key-value storage system 134 interface and always in-sync with the network elements 12 without any need of additional polling to the network elements 12.

Figure 12:
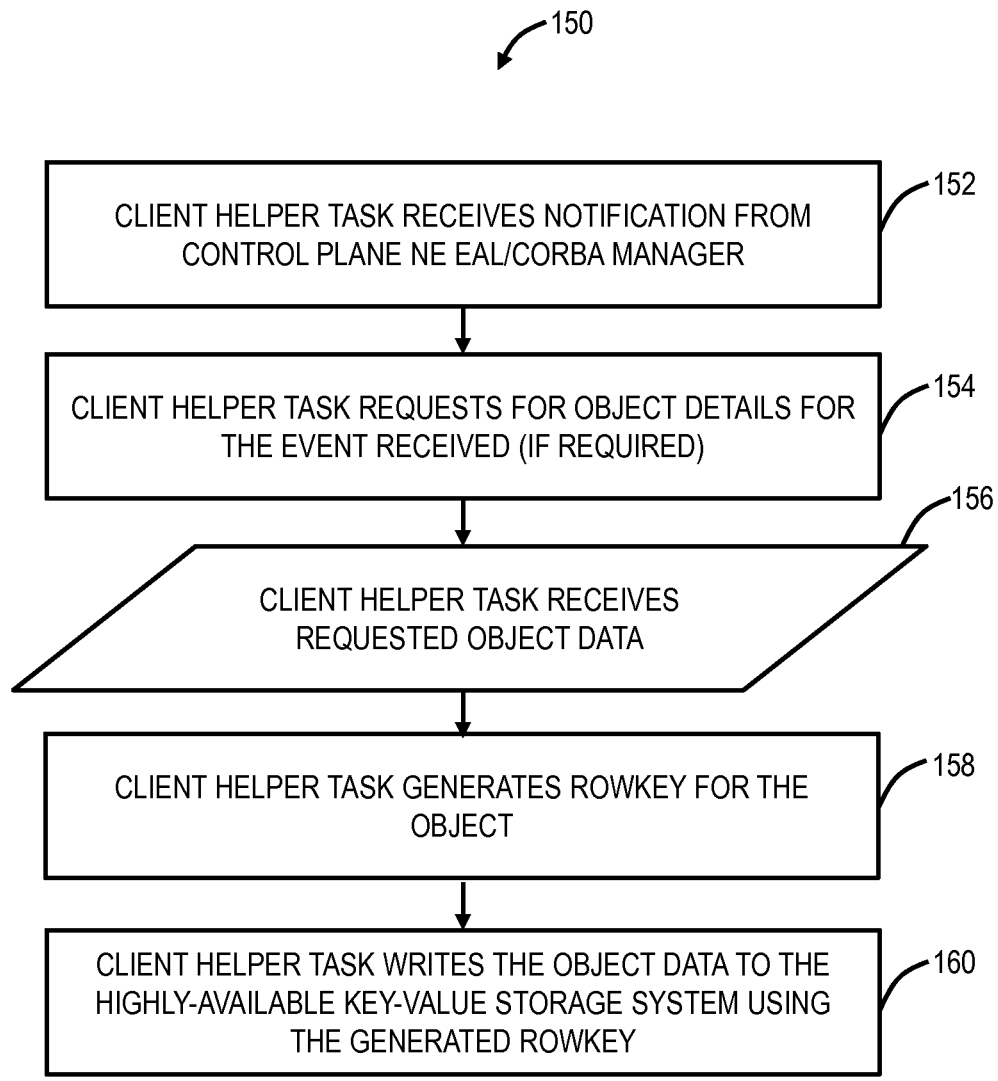
FIG. 12 is a flow chart of a data synchronization process for the key-value storage system.

Referring to FIG. 12, in an exemplary embodiment, a flow chart illustrates a data synchronization process 150 for the key-value storage system 134. The data synchronization process 150 includes the client helper task 132 receiving notification from the control plane manager 130 (step 152). The client helper task 132 requests object details for the event received (if required) (step 154). The client helper task 132 receives requested object data (step 156), and generates a Row Key for the object (step 158). Finally, the client helper task 132 writes the object data to the key-value storage system 134 using the generated Row Key (step 160).

Figure 13:
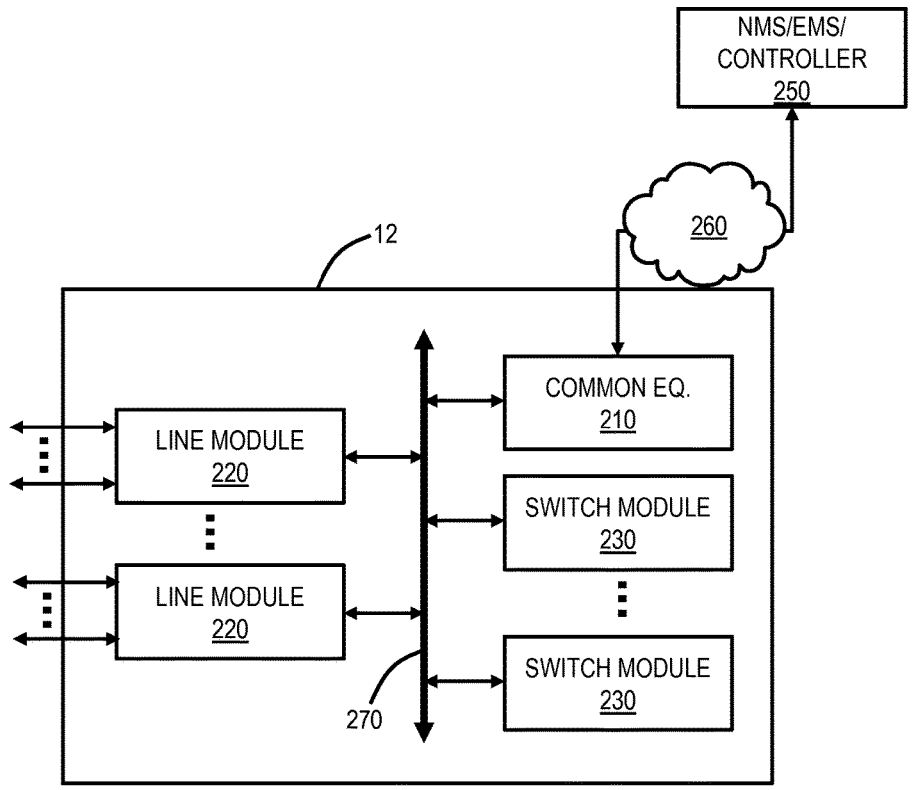
FIG. 13 is a block diagram of an exemplary network element for use with the systems and methods described herein.

Referring to FIG. 13, in an exemplary embodiment, a block diagram illustrates an exemplary network element 12 for use with the systems and methods described herein. In an exemplary embodiment, the exemplary network element 12 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation. In another exemplary embodiment, the network element 12 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the network element 12 can be any digital system with ingress and egress digital signals and switching therebetween of channels, timeslots, tributary units, etc. While the network element 12 is generally shown as an optical network element, the systems and methods contemplated for use with any switching fabric, network element, or network based thereon.

In an exemplary embodiment, the network element 12 includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a Path Computation Element (PCE), Software Defined Network (SDN) controller, OpenFlow controller, etc.). The management system 250 can include a network management system (NMS), element management system (EMS), or the like. Additionally, the common equipment 210 can include a control plane processor, such as a controller 300 illustrated in FIG. 14, configured to operate the control plane as described herein. The network element 12 can include an interface 270 for communicatively coupling the common equipment 210, the line modules 220, and the switch modules 230 therebetween. For example, the interface 270 can be a backplane, mid-plane, a bus, optical or electrical connectors, or the like. The line modules 220 are configured to provide ingress and egress to the switch modules 230 and to external connections on the links to/from the network element 12. In an exemplary embodiment, the line modules 220 can form ingress and egress switches with the switch modules 230 as center stage switches for a three-stage switch, e.g. a three stage Clos switch. Other configurations and/or architectures are also contemplated. The line modules 220 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 220 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between. The line modules 220 can include wavelength division multiplexing interfaces, short reach interfaces, and the like, and can connect to other line modules 220 on remote network elements, end clients, edge routers, and the like, e.g. forming connections on the links. From a logical perspective, the line modules 220 provide ingress and egress ports to the network element 12, and each line module 220 can include one or more physical ports. The switch modules 230 are configured to switch channels, timeslots, tributary units, packets, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 230 can include Time Division Multiplexed (TDM) (i.e., circuit switching) and/or packet switching engines. The switch modules 230 can include redundancy as well, such as 1:1, 1:N, etc. In an exemplary embodiment, the switch modules 230 provide OTN switching and/or Ethernet switching.

Those of ordinary skill in the art will recognize the network element 12 can include other components which are omitted for illustration purposes, and that the systems and methods described herein is contemplated for use with a plurality of different network elements with the network element 12 presented as an exemplary type of a network element. For example, in another exemplary embodiment, the network element 12 may not include the switch modules 230, but rather have the corresponding functionality in the line modules 220 (or some equivalent) in a distributed fashion. For the network element 12, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane. Furthermore, the network element 12 is merely presented as one exemplary network element 12 for the systems and methods described herein.

Figure 14:
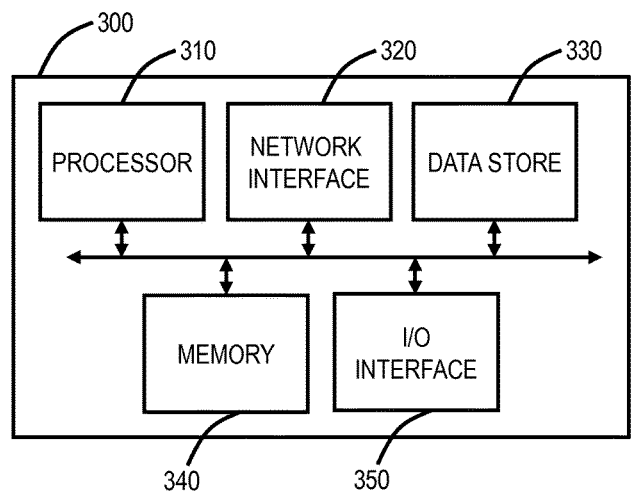
FIG. 14 is a block diagram of a controller to provide control plane processing and/or operations, administration, maintenance, and provisioning (OAM&P) for the network element of FIG. 13.

Referring to FIG. 14, in an exemplary embodiment, a block diagram illustrates a controller 300 to provide control plane processing and/or operations, administration, maintenance, and provisioning (OAM&P) for the network element 12. The controller 300 can be part of common equipment, such as common equipment 210 in the network element 12, or a stand-alone device communicatively coupled to the network element 12 via the DCN 260. The controller 300 can include a processor 310 which is a hardware device for executing software instructions such as operating the control plane. The processor 310 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 310 is configured to execute software stored within memory, to communicate data to and from the memory, and to generally control operations of the controller 300 pursuant to the software instructions. The controller 300 can also include a network interface 320, a data store 330, memory 340, an input/output (I/O) interface 350, and the like, all of which are communicatively coupled therebetween and with the processor 310.

The network interface 320 can be used to enable the controller 300 to communicate on the DCN 260, such as to communicate control plane information to other controllers, to the management system 250, and the like. The network interface 320 can include, for example, an Ethernet card (e.g., 10 BaseT, Fast Ethernet, Gigabit Ethernet) or a wireless local area network (WLAN) card (e.g., 802.11). The network interface 320 can include address, control, and/or data connections to enable appropriate communications on the network. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 300 to communicate with other devices. Further, the I/O interface 350 includes components for the controller 300 to communicate with the other nodes, such as using overhead associated with OTN signals.

In an exemplary embodiment, the controller 300 is configured to communicate with other controllers 300 in the network 10 to operate the control plane for control plane signaling. This communication may be either in-band or out-of-band. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 300 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within the Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within the Optical Channel Data Unit-k (ODUk) overhead. In the present disclosure, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 300 is configured to operate the control plane in the network 10. That is, the controller 300 is configured to implement software, processes, algorithms, etc. that control configurable features of the network 10, such as automating discovery of the nodes 12, capacity on the links, port availability on the nodes 12, connectivity between ports; dissemination of topology and bandwidth information between the nodes 12; path computation and creation for connections; network level protection and restoration; and the like. As part of these functions, the controller 300 can include a topology database that maintains the current topology of the network 10 based on control plane signaling (e.g., HELLO messages) and a connection database that maintains available bandwidth on the links again based on the control plane signaling. Again, the control plane is a distributed control plane; thus a plurality of the controllers 300 can act together to operate the control plane using the control plane signaling to maintain database synchronization. In source-based routing, the controller 300 at a source node for a connection is responsible for path computation and establishing by signaling other controllers 300 in the network 10. For example, the originating node and its controller 300 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links through the nodes 12 from the source node to the destination node based on a plurality of constraints such as administrative weights on the links, bandwidth availability on the links, etc. The originating node can also define the validation constraints that are provided in the setup messages.

In an exemplary embodiment, the client helper task 132 and the control plane manager 130 can operate on the controller 300. The key-value storage system 134 can operate between various controllers 300 and the controller 20, the EMS 14, the NMS 16, and the apps 18.

Figure 15:
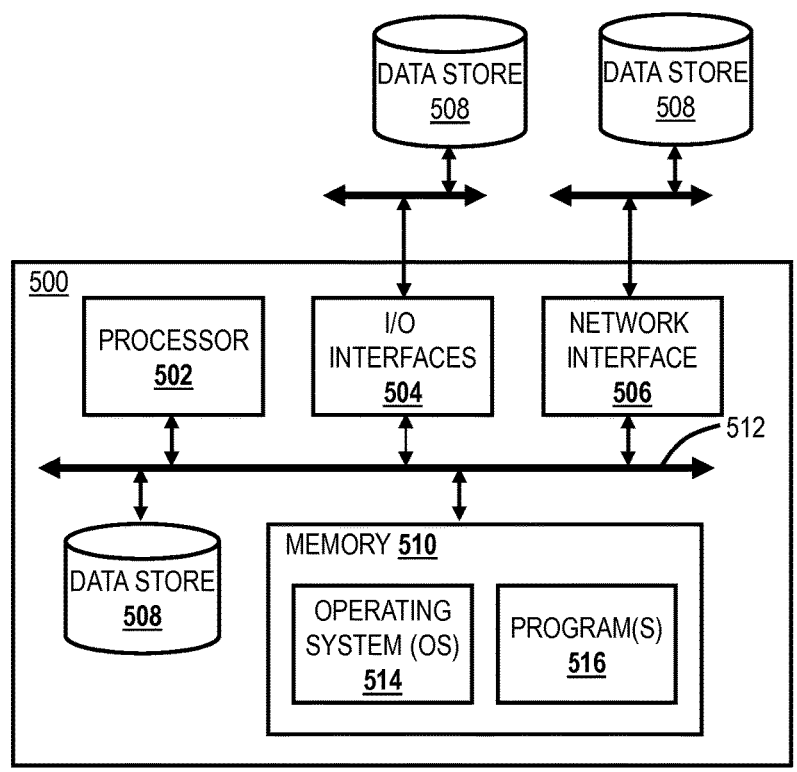
FIG. 15 is a block diagram of an exemplary SDN controller.

Referring to FIG. 15, in an exemplary embodiment, a block diagram illustrates an SDN controller 20. The SDN controller 20 can be a digital computer that, in terms of hardware architecture, generally includes a processor 502, input/output (I/O) interfaces 504, a network interface 506, a data store 508, and memory 510. It should be appreciated by those of ordinary skill in the art that FIG. 15 depicts the SDN controller 20 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 can be, for example but not limited to, one or more buses or other wired or wireless connections, as is known in the art. The local interface 512 can have additional elements, which are omitted for simplicity, such as controllers, buffers (caches), drivers, repeaters, and receivers, among many others, to enable communications. Further, the local interface 512 can include address, control, and/or data connections to enable appropriate communications among the aforementioned components.

The processor 502 is a hardware device for executing software instructions. The processor 502 can be any custom made or commercially available processor, a central processing unit (CPU), an auxiliary processor among several processors associated with the SDN controller 20, a semiconductor-based microprocessor (in the form of a microchip or chip set), or generally any device for executing software instructions. When the SDN controller 20 is in operation, the processor 502 is configured to execute software stored within the memory 510, to communicate data to and from the memory 510, and to generally control operations of the SDN controller 20 pursuant to the software instructions. The I/O interfaces 504 can be used to receive user input from and/or for providing system output to one or more devices or components. User input can be provided via, for example, a keyboard, touch pad, and/or a mouse. System output can be provided via a display device and a printer (not shown). I/O interfaces 504 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 506 can be used to enable the SDN controller 20 to communicate on a network. The network interface 506 can include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 506 can include address, control, and/or data connections to enable appropriate communications on the network. A data store 508 can be used to store data. The data store 508 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 can incorporate electronic, magnetic, optical, and/or other types of storage media. In one example, the data store 508 can be located internal to the SDN controller 20 such as, for example, an internal hard drive connected to the local interface 512 in the SDN controller 20. Additionally in another embodiment, the data store 508 can be located external to the SDN controller 20 such as, for example, an external hard drive connected to the I/O interfaces 504 (e.g., SCSI or USB connection). In a further embodiment, the data store 508 can be connected to the SDN controller 20 through a network, such as, for example, a network attached file server.

The memory 510 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 can incorporate electronic, magnetic, optical, and/or other types of storage media. Note that the memory 510 can have a distributed architecture, where various components are situated remotely from one another, but can be accessed by the processor 502. The software in memory 510 can include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein, such as the HA key-value storage system 134.

Figure 16:
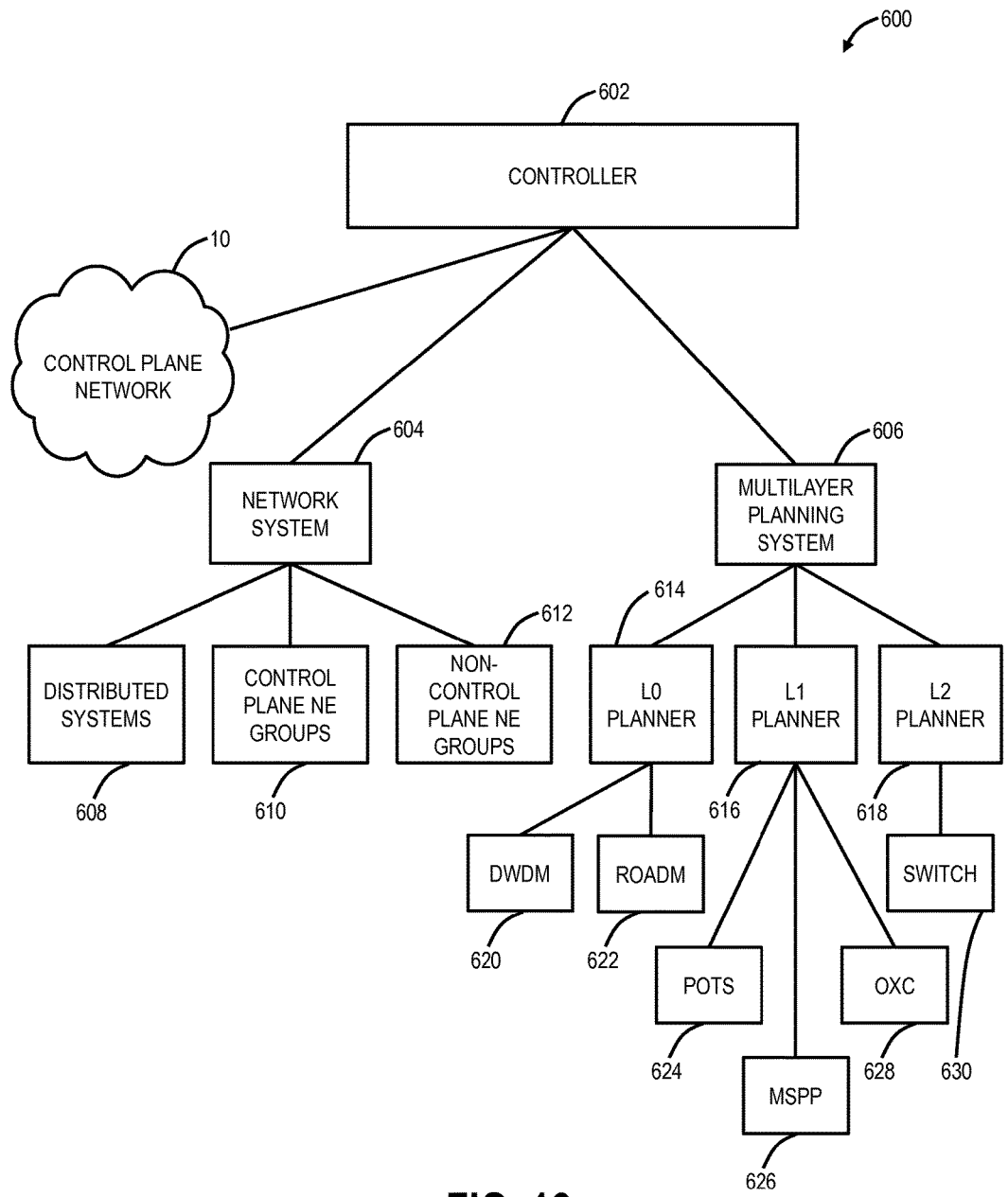
FIG. 16 is a logical diagram of a Highly-Available (HA) key-value storage system with various network devices.

Referring to FIG. 16, in an exemplary embodiment, a logical diagram illustrates a Highly-Available (HA) key-value storage system 600 with various network devices. In the various exemplary embodiments described herein, reference is made to the SDN controller 20 and the control plane network 10 and use of the HA key-value storage system therewith. FIG. 16 illustrates a generalized embodiment where the HA key-value storage system 600 is used in any network where any data needs to be synchronized in a controlled way (by manipulation of token key assignment to the systems and manipulation of row key for the data).

In FIG. 16, the HA key-value storage system 600 is illustrated with various devices in a network. For example, the HA key-value storage system 600 can include nodes from, without limitation, the control plane network 10, a controller 602, a network system 604, and a multilayer planning system 606. The controller 602 can include, without limitation, an SDN controller, an EMS, an NMS, etc. The network system 604 can include various distributed systems 608, control plane network element groups 610, and/or non-control plane network element groups 612. The multilayer planning system 606 can include a Layer 0 planner 614 (DWDM or photonic), a Layer 1 planner 616 (e.g., OTN, SONET/SDH), and/or a Layer 2 planner 618 (e.g., Ethernet, MPLS, etc.). Furthermore, the network system 604 and the multilayer planning system 606 can include various network element types which can include, without limitation, DWDM network elements 620, Reconfigurable Optical Add/Drop Multiplexer (ROADM) network elements 622, Packet-Optical Transport Systems (POTS) network elements 624, Multi-service Provisioning Platform (MSPP) network elements 626, Optical cross connect (OXC) network elements, and switches 630. That is, any of the aforementioned devices can be devices in a network using the HA key-value storage system 600.

Again, the HA key-value storage system 600 can be based on Amazon's Dynamo or Cassandra. The HA key-value storage system 600 allows data replication based on the token key value of the nodes which specifies the data range that each node is responsible. The HA key-value storage system 600 includes a process of generating and assigning the row keys to each node in the system (using N-Control bits in the MSB of the keys). This is done one time during configuration of the network. Once token keys are assigned to each node in the network, then the data on any node gets stored based on the row key. So, a process (Client Helper Task) on each node will generate a row key (automatically) for any data that needs to be stored/synchronized.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A data synchronization method, in a network, the method comprising:
   generating an event at a network element that needs to be synchronized with other devices in the network, wherein each of the other devices comprise any of a Software Defined Networking (SDN) controller, a network management system (NMS), an Element Management System (EMS), and an application executed on a server;
   determining information of the event, wherein the information comprises any one of a change in network topology, a change in node/link state information, or a change in a parameter of the network element;
   determining an assigned token of a plurality of assigned tokens for the event based on the information of the event;
   based on the determined assigned tokens for the network element, generating a row key for the event;
   providing the row key to a Highly-Available (HA) key-value storage system for synchronization therewith, wherein the HA key-value storage system includes a plurality of nodes comprising the network element and the other devices; and
   performing low latency operations in any of the other devices using the HA key-value storage system for asynchronous, master-less replication of the event.

2. The data synchronization method of claim 1, further comprising:
   installing a HA key-value storage system plugin on the network element; and
   calculating and assigning tokens for the network element, wherein the tokens are based on node key generated from a node identifier of the network element and N-control bits in most significant bits of the key.

3. The data synchronization method of claim 1, wherein the row keys are calculated and assigned for node control plane events, line control plane events, and link control plane events.

4. The data synchronization method of claim 1, further comprising:
   registering, a client helper task operating at the network element, with a Common Object Request Broker Architecture (CORBA) Manager on the network element to receive the event relating to a node, a line, or a link event.

5. The data synchronization method of claim 1, wherein the network utilizes a control plane.

6. The data synchronization method of claim 1, wherein the other device synchronizes data with the network element through the HA key-value storage system, without polling the network element.

7. The data synchronization method of claim 1, wherein the HA key-value storage system utilizes the assigned tokens to determine where to synchronize data.

8. The data synchronization method of claim 1, wherein the assigned tokens are hash based tokens generated to avoid duplication in the nodes.

9. A network element operating in a network, with data synchronization, the network element comprising:
   at least one port forming a link in the network; and
   a controller communicatively coupled to the at least one port, and wherein the controller comprises a processor and a network interface configured to
   generate an event that needs to be synchronized with other devices in the network, wherein each of the other devices comprise any of a Software Defined Networking (SDN) controller, a network management system (NMS), an Element Management System (EMS), and an application executed on a server,
   determine information of the event, wherein the information comprises any one of a change in network topology, a change in node/link state information, or a change in a parameter of the network element,
   determine an assigned token of a plurality of assigned tokens for the event based on the information of the event,
   based on the determined assigned tokens for the network element, generate a row key for the event, and
   provide the row key to a Highly-Available (HA) key-value storage system for synchronization therewith, wherein the HA key-value storage system includes a plurality of nodes comprising the network element and the other devices, wherein any of the other devices is configured to perform low latency operation using the HA key-value storage system for asynchronous, master-less replication of the event.

10. The network element of claim 9, wherein the controller is further configured to:
    install a HA key-value storage system plugin on the network element; and
    calculate and assign tokens based on node key generated from a node identifier of the network element.

11. The network element of claim 10, wherein the assigned tokens are hash based tokens generated to avoid duplication in the nodes.

12. The network element of claim 9, wherein the assigned tokens are applied for node control plane events, line control plane events, and link control plane events.

13. The network element of claim 9, wherein the controller is further configured to:
register, a client helper task operating on the controller, with a Common Object Request Broker Architecture (CORBA) Manager on the controller to receive the event relating to a node, a line, or a link event and generating row key for the data that needs to be synchronized.

14. The network element of claim 9, wherein the other device synchronizes data with the network element through the HA key-value storage system, without polling the network element.

15. The network element of claim 9, wherein the HA key-value storage system utilizes the assigned tokens to determine where to synchronize data.

16. A Software Defined Networking (SDN) controller communicatively coupled to a control plane network, the controller comprising:
a network interface;
a data store;
a processor communicatively coupled to the network interface and the data store; and
memory storing computer executable instructions, and in response to execution by the processor, the computer executable instructions cause the processor to
responsive to i) a determination of information of an event at a network element operating in a Highly-Available (HA) key-value storage system with the SDN controller, ii) a determination of the event, wherein the information comprises any one of a change in network topology, a change in node/link state information, or a change in a parameter of the network element, and iii) a determination of an assigned token of a plurality of assigned tokens for the event based on the information of the event,
receive, via the network interface, a row key from the network element, wherein the row key is computed based on the determined assigned tokens to the network element and is responsive to an event generated at the network element, and
store, in the data store, data in the row key for the network element;
wherein the HA key-value storage system includes a plurality of nodes comprising the network element and the SDN controller and a plurality of other devices comprising a any of a network management system (NMS), an Element Management System (EMS), and an application executed on a server, and
wherein any of the other devices are configured to perform low latency operations using the HA key-value storage system for asynchronous, master-less replication of the event.

17. The Software Defined Networking (SDN) controller of claim 16, wherein the SDN controller synchronizes data with the network element through the HA key-value storage system, without polling the network element.

18. The Software Defined Networking (SDN) controller of claim 16, wherein the assigned tokens are hash based tokens generated to avoid duplication in the nodes.

* * * * *